United States Patent
Wen et al.

(10) Patent No.: US 8,173,931 B2
(45) Date of Patent: May 8, 2012

(54) AUTOMATIC RECIPE MANAGEMENT FOR LASER PROCESSING A WORK PIECE

(75) Inventors: Ling Wen, Portland, OR (US); Mehmet Alpay, Portland, OR (US); Jeff Howerton, Portland, OR (US)

(73) Assignee: Electro Scientific Industries, Inc., Portland, OR (US)

( * ) Notice: Subject to any disclaimer, the term of this patent is extended or adjusted under 35 U.S.C. 154(b) by 892 days.

(21) Appl. No.: 12/164,698

(22) Filed: Jun. 30, 2008

(65) Prior Publication Data

US 2009/0308854 A1   Dec. 17, 2009

Related U.S. Application Data

(60) Provisional application No. 61/061,439, filed on Jun. 13, 2008.

(51) Int. Cl.
*B23K 26/40* (2006.01)
*G06F 19/00* (2011.01)
*G05B 19/18* (2006.01)

(52) U.S. Cl. ........... 219/121.7; 219/121.71; 219/121.78; 438/637; 700/166; 700/193

(58) Field of Classification Search .......... 438/637–640; 700/166, 193
See application file for complete search history.

(56) References Cited

U.S. PATENT DOCUMENTS

| | | | |
|---|---|---|---|
| 3,131,252 A * | 4/1964 | Farber et al. ................... 358/527 |
| 4,555,610 A * | 11/1985 | Polad et al. .............. 219/121.61 |
| 5,319,183 A * | 6/1994 | Hosoya et al. ........... 219/121.68 |
| 5,517,420 A * | 5/1996 | Kinsman et al. ............... 700/166 |
| 5,593,606 A | 1/1997 | Owen et al. |
| 5,663,076 A * | 9/1997 | Rostoker et al. ................. 438/14 |
| 5,751,585 A | 5/1998 | Cutler et al. |
| 5,841,099 A | 11/1998 | Owen et al. |
| 6,266,581 B1 * | 7/2001 | Wheatley et al. ............. 700/302 |
| 6,291,959 B1 * | 9/2001 | Yoshida et al. ............... 318/569 |
| 6,407,363 B2 | 6/2002 | Dunsky et al. |
| 6,430,465 B2 | 8/2002 | Cutler |
| 6,784,399 B2 | 8/2004 | Dunsky et al. |
| 6,975,386 B2 * | 12/2005 | Tsumura et al. ................. 356/30 |
| 7,027,199 B2 | 4/2006 | Johnson |
| 7,042,567 B2 * | 5/2006 | Balas et al. .................... 356/326 |
| 7,043,330 B2 * | 5/2006 | Toyserkani et al. ........... 700/166 |
| 7,157,038 B2 | 1/2007 | Baird et al. |
| 7,244,906 B2 | 7/2007 | Jordens et al. |
| 7,250,309 B2 * | 7/2007 | Mak et al. ........................ 438/14 |
| 7,280,883 B2 * | 10/2007 | Kitamoto et al. ............. 700/121 |

(Continued)

OTHER PUBLICATIONS

U.S. Appl. No. 12/057,264, filed Mar. 27, 2008, Peng et al.

(Continued)

*Primary Examiner* — Samuel M Heinrich
(74) *Attorney, Agent, or Firm* — Stoel Rives LLP (57) ABSTRACT

To better address these problems, one or more characteristics are measured from a work piece (28). The measurement information is used to select a preferred predetermined laser processing recipe from a lookup table. The laser processing recipe is then used to process the work piece (28). The lookup table of laser processing recipes can be established from theoretical calculations, from trial an error by an operator, from an automated systematic recipe variation process with post process testing, or from some combination of these or other methods. An automated process can also reduce operator errors and may store measurement values for convenient tracking of work piece characteristics.

20 Claims, 5 Drawing Sheets

U.S. PATENT DOCUMENTS

| | | | |
|---|---|---|---|
| 7,288,466 B2* | 10/2007 | Takeishi et al. | 438/463 |
| 7,342,664 B1* | 3/2008 | Radziszewski | 356/455 |
| 7,364,952 B2* | 4/2008 | Im | 438/150 |
| 7,732,732 B2* | 6/2010 | Hiramatsu | 219/121.7 |
| 2003/0012238 A1 | 1/2003 | Wu | |
| 2003/0178396 A1 | 9/2003 | Naumov et al. | |
| 2005/0242071 A1 | 11/2005 | Gobez et al. | |
| 2005/0265408 A1 | 12/2005 | Lei et al. | |
| 2006/0181698 A1* | 8/2006 | Treves et al. | 356/237.2 |
| 2006/0289504 A1 | 12/2006 | Hegedus | |
| 2007/0272555 A1* | 11/2007 | Baird | 204/569 |

OTHER PUBLICATIONS

U.S. Appl. No. 11/756,507, filed May 31, 2007, Lei et al.

* cited by examiner

Exemplary Recipe Selection Table

| Measurement or InputValue | RecipeName |
|---|---|
| 1.00 | Recipe1 |
| 1.05 | Recipe2 |
| 1.10 | Recipe3 |
| 1.20 | Recipe4 |

FIG. 2B

Exemplary Recipe Selection Table for the 5330 Laser System

| Measurement or InputValue | RecipeName |
|---|---|
| 0.5 | Wafer_0.5.td |
| 1.0 | Wafer_1.0.td |
| 1.5 | Wafer_1.5.td |
| 2.0 | Wafer_2.0.td |

MinInputValue = 0.5
MaxInputValue = 2.0

FIG. 3

Exemplary Recipe

| Parameter | Value |
|---|---|
| Tool type | 6 |
| Tool number | 25 |
| Tool diameter | 0.0000e+00 |
| Eff. spot size | 25.00 |
| Bite size | 3.0000e+00 |
| Velocity | 1.8000e+05 |
| Laser rep rate | 6.0000e+04 |
| Laser power | 2.7000e+00 |
| Repetitions | 1 |
| Pulses | 10 |
| Settle Time | 0.0000e+00 |
| Smoothing | 1 |
| Drill Type (1:Spiral) | 0 |
| Inside Radius | 12.50 |
| Revolutions | 5 |
| Spiral Entry | 0 |
| Compound Tool Align Flag | 0 |
| Step Number | 0 |
| Z focus offset | 0 |
| Power Cntrl Enable | 1 |
| Max Power Select | 0 |
| Power Tolerance | 1.000e+01 |
| First Pulse Enabled | 0 |
| Power control settling | 3.000000 |
| Imaging Enable | 0 |
| ZBE Spot Size | 50.0 |
| Spot Size Compensation | 0.0 |
| Stitch Enable | 0 |
| Stitch Length | 500 |
| Stitch Overlap | 200 |
| Stitch Repetitions | 1 |
| Revolutions at Perimeter | 1.00 |
| Advanced Spiral Mode | 1 |
| Advanced Spiral Revolutions | 5.00 |
| Pulse Distribution Enabled | 1 |

AUTOMATIC RECIPE MANAGEMENT FOR LASER PROCESSING A WORK PIECE

RELATED APPLICATION

This application claims benefit of U.S. Provisional Patent Application No. 61/061,439, filed Jun. 13, 2008.

TECHNICAL FIELD

The present invention relates to laser processing a work piece and, in particular, to measuring characteristics of a work piece and determining which preferred predetermined processing recipe to use for processing the work piece.

COPYRIGHT NOTICE

©2008 Electro Scientific Industries, Inc. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71 (d).

BACKGROUND INFORMATION

Laser processing, such as micromachining, can be conducted on numerous different work pieces using various lasers effecting a variety of processes. For example, lasers are used to drill vias in and ablate material from electronic materials products, such as homogenous films, particulate filled resins, polyimides, and fiber reinforced polymers, either with or without metal cladding.

A goal of laser micromachining operations is to provide consistent quality of laser micromachined features from work piece to work piece and over an entire work piece. In general, the quality of a laser-processed material refers to a standard of excellence specified by a customer of laser processing equipment. Quality metrics differ for different laser processing operations. Some measures which define feature quality include the location, size, and shape of the feature. Other measures include sidewall angle, bottom texture, the amount of cracking near the edge of the feature, as well as the volume and texture of debris left in the feature after micromachining.

One problem with laser micromachining operations as discussed herein is that, due to non-uniformities in the work pieces, performing the machining operations with the same laser parameters on two different work pieces or at two different locations on the work piece can result in differences in feature qualities. Examples of work piece differences that influence the results include differences in thickness, differences in work piece flatness, and differences in surface preparation that makes the work piece more or less reflective of laser power. These variations are not constant from work piece to work piece or over an entire work piece and can vary depending upon location down to an individual feature. However, in some cases, these variations can be repetitive from work piece to work piece in a given lot of work pieces due to normal variations in manufacturing tolerances.

To address part of this problem, the thickness of a work piece is measured and a operator manually determines what laser processing recipe should be used. The user then conveys the recipe to the laser processing system.

SUMMARY OF THE DISCLOSURE

To better address these problems, one or more characteristics are measured from a work piece. The measurement information is used to select a preferred predetermined laser processing recipe from a lookup table. The laser processing recipe is then used to process the work piece.

The lookup table of laser processing recipes can be established from theoretical calculations, from trial an error by an operator, from an automated systematic recipe variation process with post process testing, or from some combination of these or other methods.

An automated process can also reduce operator errors and may store measurement values for convenient tracking of work piece characteristics.

Additional objects and advantages of this invention will be apparent from the following detailed description of preferred embodiments thereof, which proceeds with reference to the accompanying drawings.

DETAILED DESCRIPTION OF PREFERRED EMBODIMENTS

Figure 1:
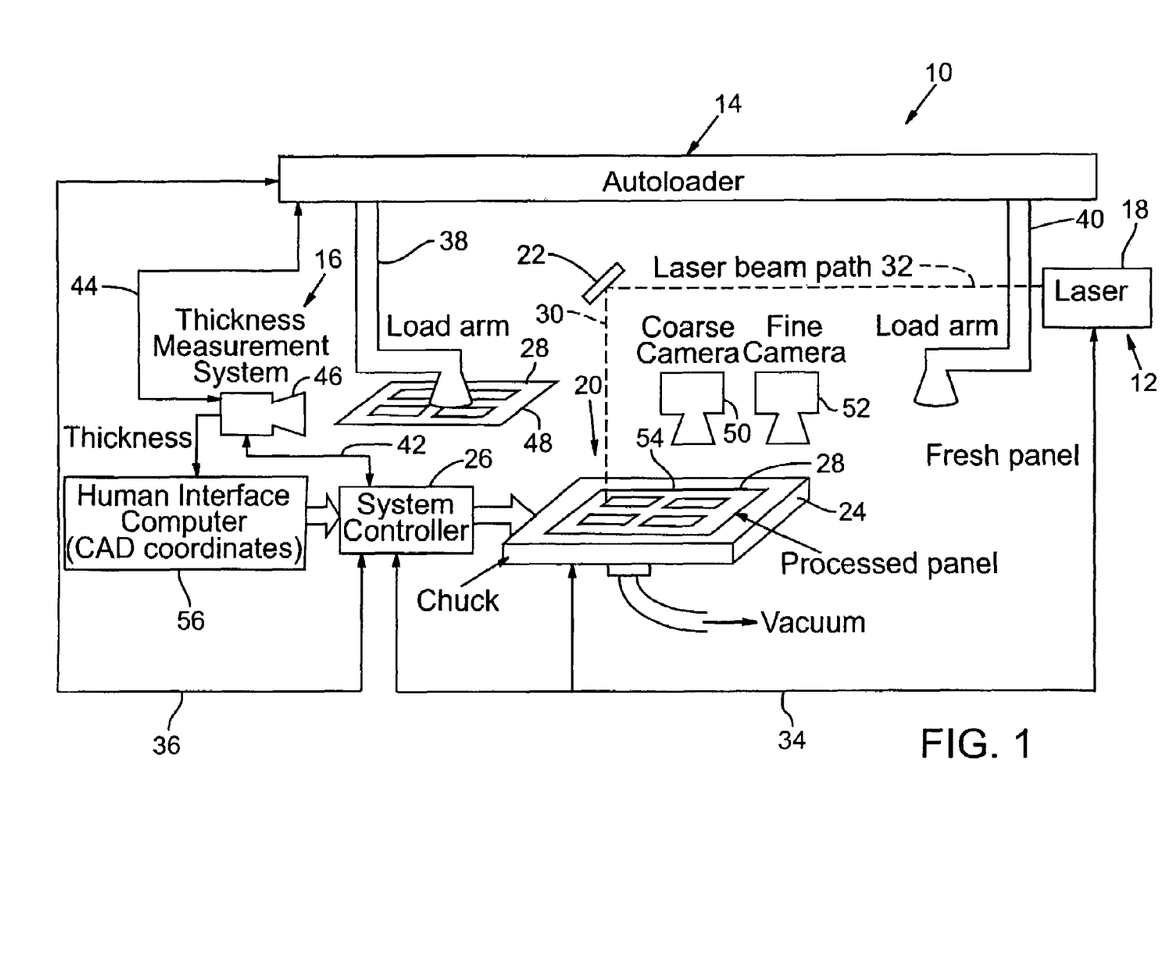
FIG. 1 is a partly schematic diagram of an integrated laser micromachining system including a laser system, an automatic loading system, and a measurement system.

FIG. 1 is a partly schematic diagram of an integrated laser micromachining system 10 including a laser processing system 12, an automatic loading system 14, and a measurement system 16. Laser processing system 12 is discussed herein only by way of example to a via drilling system such as for the laser processing of a single or multilayer work piece on a semiconductor wafer or printed circuit board (PCB) panel to effect through hole and/or blind via formation. Skilled persons will appreciate that the laser processing methods described herein could also be applied to any type of laser micromachining, including but not limited to ablative patterning of microstructures, trimming passive thick or thin film components, wafer dicing or drilling, or removal of semiconductor links (fuses), and thermal annealing.

In some embodiments, laser processing system 12 includes one or more lasers 18 and a beam and work piece positioning system 20, represented by beam deflecting mirror 22 and work piece chuck 24. Exemplary laser processing systems, and via drilling systems in particular, are disclosed in detail in U.S. Pat. Nos. 5,593,606 and 5,841,099 of Owen et al., U.S. Pat. Nos. 6, 407,363 and 6,784,399 of Dunsky et al., U.S. Pat. No. 7,157,038 of Baird et al., U.S. Pat. No. 7,244,906 of Jordens et al., U.S. Pat. Pub. No. 2005-0265408 of Lei et al., and U.S. patent application Ser. No. 11/756,507 of Lei et al., U.S. patent application Ser. No. 12/057,264 of Peng et al. These patents, publications, and applications are herein incorporated by reference. In some embodiments, a preferred laser processing system 12 includes a Model 5330 laser system or other systems in its series manufactured by Electro-Scientific Industries, Inc., Portland, Oreg., the assignee of the present patent application.

Exemplary lasers 18 include one or more of lasers 18 disclosed in the previously mentioned patents, publications, and applications. Exemplary beam and work piece positioning systems 20 are also disclosed in the previously mentioned patents, publications, and applications. Additional exemplary beam and work piece positioning systems 20 include those described in U.S. Pat. Nos. 5,751,585 and 6,430,465 of Cutler et al. and U.S. Pat. No. 7,027,199 of Johnson, which are herein incorporated by reference.

In some embodiments, laser 18 may be a UV laser, an IR laser, a green laser, or a $CO_2$ laser. An exemplary processing laser output has a pulse energy that is between about 0.01 μJ and about 1.0 J. In some embodiments, a preferred UV processing laser is a Q-switched UV DPSS laser including a solid-state lasant such as Nd:YAG, Nd:YLF, Nd:YAP, or Nd:YVO4, or a YAG crystal doped with ytterbium, holmium, or erbium. The UV laser preferably provides harmonically generated UV laser output at a wavelength such as 355 nm (frequency tripled Nd:YAG), 266 nm (frequency quadrupled Nd:YAG), or 213 nm (frequency quintupled Nd:YAG).

In some embodiments, a preferred $CO_2$ processing laser is a pulsed $CO_2$ laser operating at a wavelength of between about 9 μm and about 11 μm. An exemplary commercially available pulsed $CO_2$ laser is the Model Q3000 Q-switched laser (9.3 μm) manufactured by Coherent-DEOS of Bloomfield, Conn.

Laser 18 and beam and work piece positioning system 20 are directly or indirectly in signal communication with each other and laser system controller 26 to coordinate the position of work piece 28 on chuck 24 with the position of laser beam axis 30 with relation to the timing of laser pulses propagated along laser beam path 32. Information and/or command signals may flow in one direction or either direction along communication pathway 34 that connects these subsystems.

Some common materials used in making exemplary work pieces 28, such as multilayer structures for printed circuit board (PCB) and electronic packaging devices, in which vias are formed typically include metals (e.g., copper) and dielectric materials (e.g., polymer polyimide, resin, or FR-4). Other common work pieces 28 are described in detail in the aforementioned patents, publications, and applications.

Preferred single layer work pieces include thin copper sheets; polyimide sheets for use in electrical applications; and other metal pieces, such as aluminum, steel, and thermoplastics used in general industry and medical applications, or silicon or other semiconductor materials used as substrates for building electronic circuits upon. Preferred multilayer work pieces include a multi-chip module (MCM), circuit board, or semiconductor microcircuit package. In some embodiments, a metal layer may include but is not limited to, aluminum, copper, gold, molybdenum, nickel, palladium, platinum, silver, titanium, tungsten, a metal nitride, or a combination thereof. In some embodiments, metal layers preferably have thicknesses that are between about 9 μm and about 36 μm, but they may be thinner than 9 μm or as thick as 72 μm.

In some embodiments, an organic dielectric material layer may include a benzocyclobutane (BCB), bismaleimide triazine (BT), cardboard, a cyanate ester, an epoxy, a phenolic, a polyimide, polytetrafluoroethylene (PTFE), a polymer alloy, or a combination thereof. Each organic dielectric layer is typically thicker than the metal layer(s). In some embodiments, the preferred thickness of an organic dielectric layer is between about 20 μm and about 400 μm, but an organic dielectric layer may be placed in a stack having a thickness as great as 1.6 mm, for example.

An organic dielectric layer may include a thin reinforcement component layer. The reinforcement component layer may include fiber matte or dispersed particles of, for example, aramid fibers, ceramics, or glass that have been woven or dispersed into the organic dielectric layer. The reinforcement component layer may be typically much thinner than the organic dielectric layer and may have a thickness that is between about 1 μm and about 10 μm. Skilled persons will appreciate that reinforcement material may also be introduced as a powder into the organic dielectric layer. The reinforcement component layer including this powdery reinforcement material may be noncontiguous and nonuniform.

Skilled persons will appreciate that the layers may be internally noncontiguous, nonuniform, and nonlevel. Stacks having several layers of metal, organic dielectric, and reinforcement component materials may have a total thickness that is greater than 2 mm. Work piece compositions and dimensions are constantly changing, and these examples should not be considered as limiting.

Laser processing system 12 is directly or indirectly in signal communication with automatic loading system 14 through communication pathway 36 that connects these subsystems and may convey information and/or command signals in one direction or either direction along pathway 36. In some embodiments, laser system controller 26 provides the interface between automatic loading system 14 and laser processing system 12.

An exemplary automatic loading system 14 includes one or more load arms 38 and one or more unload arms 40. However, a skilled person will appreciate that a single arm could be used to perform either function. In some embodiments, an automatic loading system 14 may take the form of a wafer handling system or a cassette or an intermediate chuck handling system, or a front end loader. One example of a suitable automatic loading system is an Model PL-5330, which is designed and manufactured specifically for Electro Scientific Industries, Inc. by Lexus Automation Ltd., Kowloon, Hong Kong. A variety of automatic PCB and wafer loading systems are commercially available and well known to skilled practitioners.

Laser processing system 12 and/or automatic loading system 14 are directly or indirectly in signal communication with measurement system 16 through communication pathways 42 and 44, respectively, that connect these subsystems and may convey information and/or command signals in one direction or either direction along pathways 42 and 44. In some embodiments, laser system controller 26 provides the interface between laser processing system 12 and measurement system 16 and/or between automatic loading system 14 and measurement system 16.

Measurement system 16 may include one or more cameras 46 or other means for means for measuring one or more characteristics of work piece 28. For example, one or more cameras 46 may be positioned to obtain thickness measurements from one or more sides 48, regions, or intended feature locations of work piece 28 as automatic loading system 14 moves work piece 28 onto chuck or platform 24. Measurement system 16 may also include additional cameras 50 and 52, such as course and fine cameras, positioned to obtain views of the surfaces 54 of work piece 28 to obtain measurements of surface characteristics such as shininess or reflectivity.

Skilled persons will appreciate that the measurement system 26 and its cameras 46, 50, 52 or other sensors or detectors may be stand alone systems or subsystems or that they may be integrated with one or both of automatic loading system 14 and laser processing system 12. Integration with automatic loading system 14 may be desirable to facilitate viewing angles not possible when work piece 28 is supported by chuck or platform 24. Integration with laser processing system 12 may be desirable if cameras 46, 50, 52 or other sensors or detectors can also be used for positioning, such as work piece or feature alignment, or real time feed back during processing, such as feature characteristics. An operator interface 56 may also be associated with, and directly or indirectly communicate with, one or more of the systems or subsystems.

Figure 5:
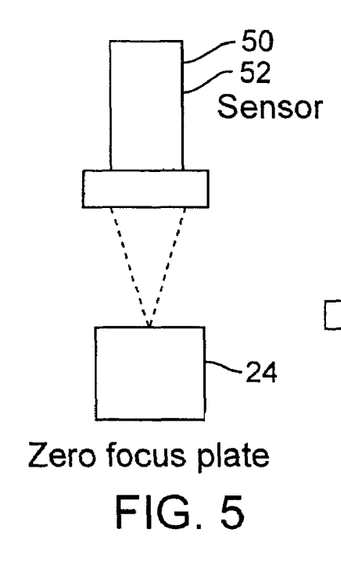
FIG. 5 is a side elevation view demonstrating how an exemplary measurement system component can obtain a zero reference focus value.
Figure 6:
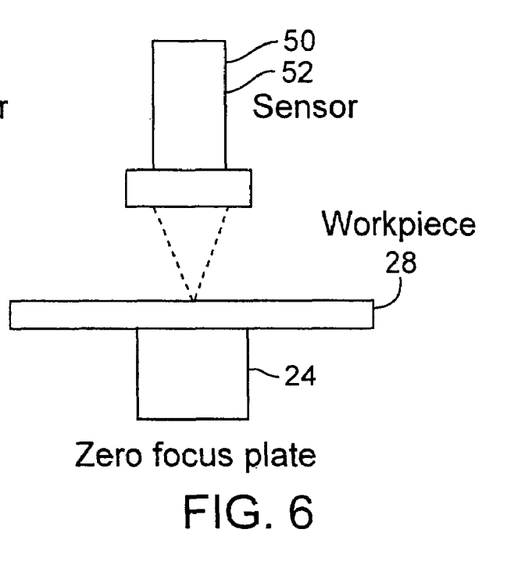
FIG. 6 is a side elevation view demonstrating how an exemplary measurement system component can obtain a thickness value by determining the change in focus from the zero reference focus value.

FIGS. 5 and 6 demonstrate another example of how a thickness measurement may be obtained with camera 50 and/or 52 or other sensor. With reference to FIGS. 5 and 6, camera 50 and/or 52 (or other sensor) can be focused on the surface of the chuck 24 or some other support platform to obtain a zero reference focus value. Automatic loading system 14 then loads work piece 28 onto the chuck 24 or some other support platform. Camera 50 and/or 52 (or other sensor) then refocuses on the surface of work piece 28. The change in focus values is converted into a thickness value. The thickness measurements may be made at random locations, at predetermined locations, such as locations to obtain average thickness values for separate regions, or at each location of an intended feature. The thickness values are stored in memory for use in determining processing recipes as later discussed, and these values may also be for later assessment of feature quality and determination of whether modified or additional processing is desirable. Some exemplary stand alone measurement systems include Wafersight2 or VisEdge CV300 manufactured by KLA-tencor.

Work pieces 28, or regions of work pieces 28, having different characteristics, such as thicknesses, should be processed differently to obtain features having the same desired quality. In the context of simplest examples, a thicker region or work piece 28 may benefit from one or more additional pulses to create a feature of desired quality while a thinner region or work piece 28 may benefit from fewer pulses to create a feature of desired quality. The shininess of a work piece 28 may also provide information that could be used to modify a generic processing recipe for creating a feature. Skilled persons will appreciate that numerous other characteristics of work piece 28 that would affect a processing recipe could be measured.

Figure 2A:
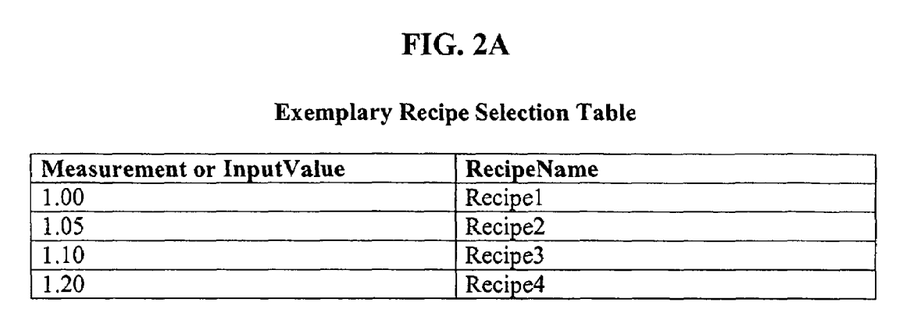
FIG. 2A is a generic recipe selection table.
Figure 2B:
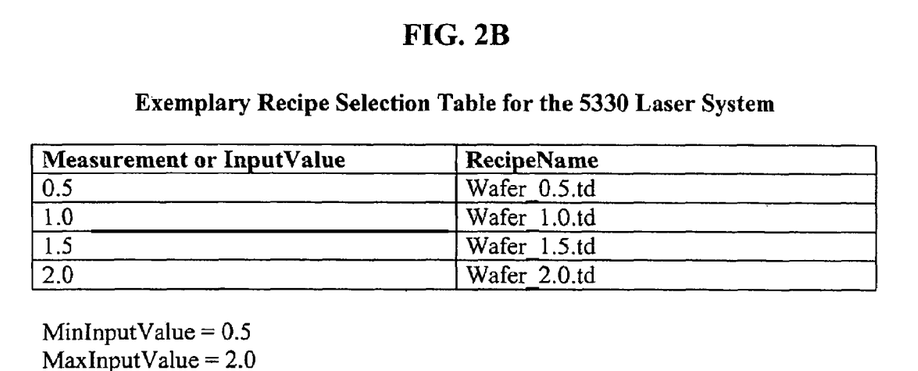
FIG. 2B is an exemplary recipe selection table used on a 5330 Laser Via Drilling System.

FIGS. 2A and 2B show exemplary recipe look up tables based on a thickness measurement value. For example, for a measured average thickness value of 1.05 of work piece 28, recipe 2 would be implemented to process the entire work piece 28, as shown in FIG. 2A. Alternatively, if characteristic(s) for work piece regions or individual target locations are measured, each region or target location for a work piece 28 would be processed with an appropriate recipe associated with the specific measurement value. Thus, the measurement value(s) would be stored and associated with specific locations on the work piece 28. FIG. 2B presents an exemplary recipe selection table for implementation of via drilling with the Model 5330 laser system.

Figure 3:
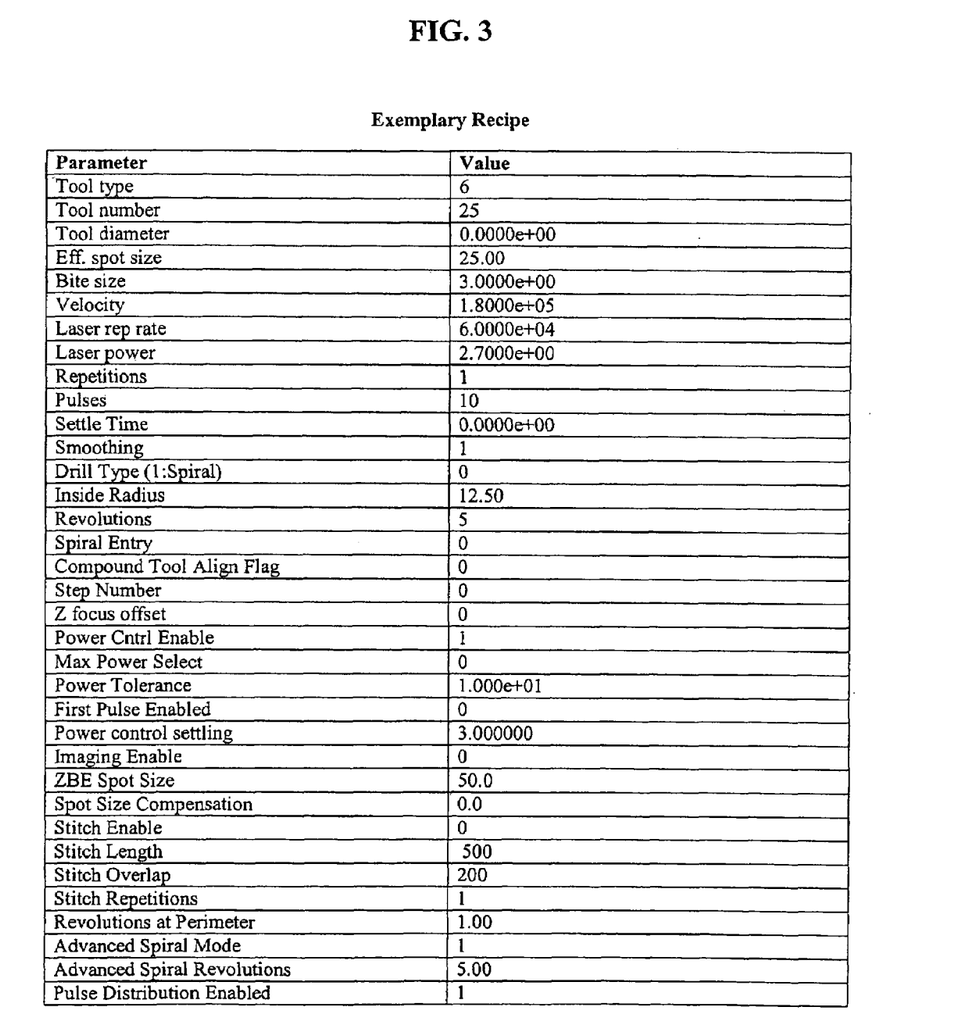
FIG. 3 is an exemplary recipe that may be associated with a measurement value.

FIG. 3 is an exemplary recipe that may be implemented for processing a work piece 28 in response to a measurement value. In some embodiments, there is a one-to-one correspondence between a measurement value and a recipe. Skilled persons will appreciate, however, that a measurement value in a look up table will typically include a range of measurement values. In some embodiments, the measurement value is an average thickness value for work piece 28, an average thickness value for a region of work piece 28, or a thickness value for the location of an intended target or feature on work piece 28. In some embodiments, the recipe prescribes the parameters to be implemented for drilling a via of specific characteristics on work piece 28, such as diameter and depth.

A recipe typically includes, but is not limited to, laser parameters associated with spot size, bite size, repetition rate, velocity of the positioning system, laser power, number of passes, number of pulses, and movement pattern. Skilled persons will appreciate that the exemplary parameters listed in the recipe presented in FIG. 3 is not exhaustive and that many parameters or variations of them can be expressed by different combinations of variables. Similarly, the recipe parameters will vary with different feature attributes such as via diameter or work piece material and with different laser types and beam and substrate positioning systems.

For example, where the positioning system permits, any of the drilling techniques or patterns disclosed in U.S. Pat. Nos. 6,407,363 and 6,784,399 of Dunsky et al. may be employed. Such techniques and patterns include, but are not limited to, spiraling, concentric circle, and trepanning processing. Skilled persons will appreciate that the deformable mirror employed in U.S. Pat. No. 6,407,363 could be replaced with other high speed steering devices, such as one or more acousto-optic devices as disclosed in and U.S. Pat. No. 7,027,199 of Johnson, to implement a variety of these patterns.

Skilled persons will appreciate that recipe look up tables may be responsive to more than one measurement value, such as using both thickness values and shininess values in a matrix to determine the best recipe for processing a specific work piece 28, region, or location. Similarly, three or more measurement values (or ranges of values) may be assembled in multidimensional matrices that indicate "best" recipes based on some or all the measured characteristics.

The lookup table of laser processing recipes can be established from theoretical calculations, from trial an error by an operator, from an automated systematic recipe variation process with post process testing, or from some combination of these or other methods. As more information is collected, the look up tables can become more complex and accurate to reflect processing history. Such history may include variations of the laser operation as well as variations in the recipes.

Figure 4:
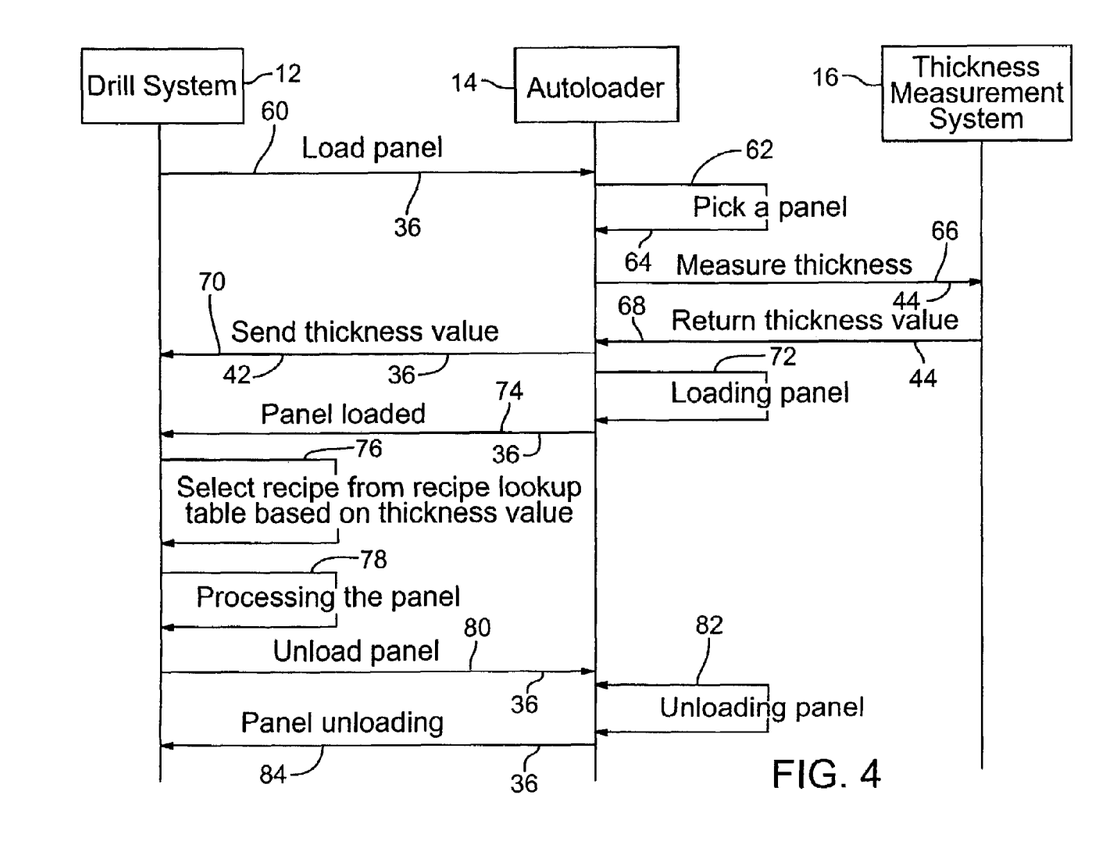
FIG. 4 is a flow diagram of an exemplary loading, measuring, laser micromachining, and unloading process.

FIG. 4 is a flow diagram of an exemplary loading, measuring, laser micromachining, and unloading process. In a simplified exemplary implementation of some embodiments, a laser processing system 12 for drilling vias employs instruction step 60 to request automatic loading system 14 to load a work piece 28. In loading step 62, automatic loading system 14 selects a work piece 28 from a storage rack or conveyor (not shown). In movement or positioning step 64, automatic loading system 14 moves work piece 28 to facilitate measurement of one or more of its characteristics, and conveys measuring instructions to measurement system 16 in an instruction step 66.

In measuring step 68, measurement system 16 acquires the measurements of one or more characteristics of work piece 28. The characteristics may be acquired from one or more work piece sides, surfaces, regions, or specific intended target or feature locations. The measurements may be obtained by one or more cameras 46 while the work piece 28 is being transported to laser processing system 12 or in one or more specific positions while suspended from load arm 38. Measurements may also be obtained by cameras 50 and 52 after work piece 28 is loaded onto chuck 24 of laser processing system 12. Measurement system 16 may analyze or process the raw data, such as to provide average measurement values and forwards the processed or raw data directly or indirectly to laser processing system 12, such as through automatic loading system 14 and data conveying step 70.

In loading step 72, automatic loading system 14 finishes loading work piece 28 onto chuck 24 of laser processing system 12 (if not already done during the measurement cycle) and informs laser processing system 12 through instruction step 74 that work piece 28 has been loaded.

In recipe determination step 76, laser processing system 12 uses the measurement information to look up in a table, such as exemplified in FIGS. 2A and 2B, a preferred recipe for processing work piece 28 or preferred recipes for processing its regions or intended target or feature locations. In processing step 78, laser processing system 12 processes work piece 28, its regions, or intended target or feature locations in accordance with the recipes obtained from the look up table.

In instruction step 80, laser processing system 12 notifies automatic loading system 14 that work piece 28 has been processed. Automatic loading system 14 unloads work piece from chuck 24 in unloading step 82 and notifies laser processing system 12 that work piece 28 has been unloaded in notification step 84. Laser processing system 12 is then ready to request the loading of a new work piece 28.

Skilled persons will appreciate that the communication pathways may vary depending on the capabilities of the various system components. In particular, skilled person will appreciate that various software for implementing the flow process may be primarily associated with a single system or subsystem such as laser controller 26. Alternatively, the software may be located wholly or partly on various systems, subsystems, or subsystem components. For example, cameras 46, 50, and 52 may contain measurement processing software as well as image processing software, or all or most of the data processing can done or governed by the laser controller 26. Laser controller 26 may also directly ask measurement system 16 to make the measurements rather than the instructions coming from automatic loading system 14, for example. Numerous variations are possible.

Skilled person will also appreciate that the recipes provided by the look up tables are parameter guidelines and that the recipes may be changed in real time based on process monitoring, for example. Such process monitoring may track one or more of degradation of optics within laser processing system 12, variations in the performance of laser 18, or abbe or other positioning errors associated with beam and work piece positioning system 20, for example. U.S. Pat. No. 7,244,906 of Jordens et al. describes in detail how some of these real time adjustments may be implemented.

It will be obvious to those having skill in the art that many changes may be made to the details of the above-described embodiments of this invention without departing from the underlying principles thereof. The scope of the present invention should, therefore, be determined only by the following claims.

The invention claimed is:

1. A method for processing multiple work pieces with a laser micromachining system, comprising:
    receiving a first work piece from a supply of multiple work pieces, including at least first and second work pieces, wherein each work piece has multiple characteristics, including different first and second characteristics, wherein the first characteristic of the first work piece has a first primary value and the second characteristic of the first work piece has a first secondary value, wherein the first characteristic of the second work piece has a second primary value and the second characteristic of the second work piece has a second secondary value, wherein the first primary value is different from the second primary value, and wherein the first secondary value is different from the second secondary value;
    acquiring information regarding the first and second characteristics of the first work piece;
    assigning a first primary measurement value to the first characteristic of the first work piece based on the quality of the first characteristic of the first work piece;
    assigning a first secondary measurement value to the second characteristic of the first work piece based on the quality of the second characteristic of the first work piece;
    selecting from a look up table a first laser processing recipe associated with the first primary and first secondary measurement values, the first processing recipe including multiple parameters for processing the first work piece to create a feature having predetermined attributes in the first work piece;
    employing a laser system including a beam positioning system and/or a substrate positioning system to create one or more of the features having the predetermined attributes in the first work piece;
    receiving the second work piece from the supply of multiple work pieces;
    acquiring information regarding the first and second characteristics of the second work piece;
    assigning a second primary measurement value to the first characteristic of the second work piece based on the quality of the first characteristic of the second work piece;
    assigning a second secondary measurement value to the second characteristic of the second work piece based on the quality of the second characteristic of the second work piece;
    selecting from the look up table a second laser processing recipe associated with the second primary and second secondary measurement values, the second processing recipe including multiple parameters for processing the second work piece to create the feature having the predetermined attributes in the second work piece, wherein the second processing recipe is different from the first processing recipe; and
    employing the laser system including the beam positioning system and/or the substrate positioning system to create one or more of the features having the predetermined attributes in the second work piece.

2. The method of claim 1 in which the laser micromachining system is a via drilling system and the feature is a via.

3. The method of claim 1 in which the work piece is a printed circuit board or a semiconductor wafer.

4. The method of claim 1 in which the first characteristic is thickness or shininess.

5. The method of claim 1 in which the first characteristic is thickness and the second characteristic is shininess.

6. The method of claim 1 in which the look up table employs a range of measurement values that includes the first primary measurement value associated with the first processing recipe.

7. The method of claim 1 in which multiple measurement values for each of the first and second characteristics are assembled into a matrix and the first processing recipe is associated with a correlation of the first primary measurement value with the first secondary measurement value.

8. The method of claim 1 in which information is acquired with one or more cameras.

9. The method of claim 1 in which each of the first and second work pieces is in more than one position while the information is acquired about the first characteristic.

10. The method of claim 1 in which the information is acquired about the first and second characteristics of the first work piece at multiple regions, including first and second regions wherein the first region includes a first location and the second region includes a second location, wherein the first and second locations are associated with intended respective identical first and second features, wherein the first primary value at the first region is different from the first primary value at the second region, and wherein different processing recipes are employed to create the first and second features on the first work piece.

11. The method of claim 1 in which different means are used to acquire information about different characteristics.

12. The method of claim 1 in which information from more than one location on the first work piece is used to determine the first primary measurement value.

13. The method of claim 10 in which the first primary value within the second region is determined after the first feature is created.

14. The method of claim 1 in which an attribute of the feature in the first work piece is measured and a parameter in the lookup table is adjusted prior to creating the feature again in the first work piece.

15. The method of claim 1 in which prior to creating the feature the first processing recipe is adjusted in real time in response to data concerning the laser system.

16. The method of claim 1 in which the parameters include one or more of type, size, pulse repetition rate, number of pulses, pulse shape, pulse width, pulse energy, peak pulse power, pulse energy tolerance, settling time, spot size, beam shape, or wavelength; in which the feature specifications include one or more of type, location, depth, shape, size, diameter, or allowable debris left after micromachining; and in which the parameters include one or more of movement pattern of the beam position system, bite size, velocity of the beam position system, or number of passes.

17. The method of claim 1 in which the first and second work pieces are printed circuit boards or semiconductor wafers, in which the laser micromachining system is a via drilling system and the feature is a via, in which the first characteristic is thickness and the second characteristic is shininess, and in which first and second identical features are drilled sequentially in the first work piece.

18. The method of claim 1 further comprising:
prior to acquiring the information, selecting first and second characteristics that impact laser machining parameters that affect attributes of the feature to be created in the first work piece.

19. A method for processing multiple work pieces with a laser micromachining system, comprising:
receiving a first work piece from a supply of multiple work pieces, including at least first and second work pieces, wherein each work piece has multiple characteristics, including different first and second characteristics, wherein the first characteristic of the first work piece has a first primary value, wherein the first characteristic of the second work piece has a second primary value, wherein the first primary value is different from the second primary value, and wherein the first characteristic comprises thickness of the first work piece, wherein the first and second work pieces comprise either semiconductor wafers or printed circuit boards;
optically measuring information regarding the first characteristic of the first work piece;
assigning a first primary measurement value to the first characteristic of the first work piece based on the quality of the first characteristic of the first work piece;
selecting from a look up table a first laser processing recipe associated with the first primary measurement value, the first processing recipe including multiple parameters for processing the first work piece to create a via having predetermined attributes in the first work piece;
employing a laser system including a beam positioning system and/or a substrate positioning system to sequentially create multiple vias having the predetermined attributes in the first work piece;
receiving the second work piece from the supply of multiple work pieces;
optically measuring information regarding the first characteristic of the second work piece;
assigning a second primary measurement value to the first characteristic of the second work piece based on the quality of the first characteristic of the second work piece;
selecting from the look up table a second laser processing recipe associated with the second primary measurement value, the second processing recipe including multiple parameters for processing the second work piece to create the via having the predetermined attributes in the second work piece, wherein the second processing recipe is different from the first processing recipe; and
employing the laser system including the beam positioning system and/or the substrate positioning system to sequentially create multiple vias having the predetermined attributes in the second work piece.

20. A system, comprising:
a work piece loader obtaining a first work piece from a supply of multiple work pieces, including at least first and second work pieces, wherein each work piece has multiple characteristics, including different first and second characteristics, wherein the first characteristic of the first work piece has a first primary value and the second characteristic of the first work piece has a first secondary value, wherein the first characteristic of the second work piece has a second primary value and the second characteristic of the second work piece has a second secondary value, wherein the first primary value is different from the second primary value, and wherein the first secondary value is different from the second secondary value;
a measurement system for measuring first and second characteristics of each of the first and second work pieces and for assigning the first primary and first secondary measurement values to the respective first and second characteristics of the first work piece and assigning the second primary and second secondary measurement values to the respective first and second characteristics of the second work piece;
laser processing software for providing a first laser processing recipe associated with the first primary and first secondary measurement values, the first processing recipe including multiple parameters for processing the first work piece to create a feature having predetermined attributes in the first work piece, and for providing a second processing recipe associated with the second primary and second secondary measurement values, the second processing recipe including multiple parameters for processing the second work piece to create the feature having the predetermined attributes in the second work piece, wherein the second processing recipe is different from the first processing recipe;
a laser system for providing laser output;
a beam delivery system for delivering the laser output along a beam axis;

a work piece positioning system for positioning at least one of the first or second work pieces in relation to the measurement system and/or the beam axis; and a laser controller for directly or indirectly implementing the first and second processing recipes associated with the measurement values of the characteristics through direct or indirect control of one or more of the laser system, the beam delivery system, or the work piece positioning system to create the features with the predetermined attributes in the first and second work pieces.

* * * * *